United States Patent
Suriarachchi et al.

(10) Patent No.: US 11,120,049 B2
(45) Date of Patent: Sep. 14, 2021

(54) CONCURRENT DATA IMPORTS

(71) Applicant: ServiceNow, Inc., Santa Clara, CA (US)

(72) Inventors: Amila Chinthaka Suriarachchi, San Diego, CA (US); Matthew Breckenridge Stoddart, San Diego, CA (US); Lubomir Kostadinov Vardin, Aliso Viejo, CA (US); Francis van Aeken, Poway, CA (US); Pankaj Puniani, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 388 days.

(21) Appl. No.: 16/195,545

(22) Filed: Nov. 19, 2018

(65) Prior Publication Data

US 2020/0159746 A1    May 21, 2020

(51) Int. Cl.
*G06F 16/23* (2019.01)
*G06F 16/27* (2019.01)
*G06F 16/25* (2019.01)
*G06F 16/22* (2019.01)

(52) U.S. Cl.
CPC ........ *G06F 16/278* (2019.01); *G06F 16/2282* (2019.01); *G06F 16/2379* (2019.01); *G06F 16/254* (2019.01)

(58) Field of Classification Search
CPC ............. G06F 16/2282; G06F 16/2379; G06F 16/278; G06F 16/258; G06F 16/27
See application file for complete search history.

(56) References Cited

U.S. PATENT DOCUMENTS

| | | |
|---|---|---|
| 6,122,630 A * | 9/2000 | Strickler ................. G06F 16/27 |
| 6,321,229 B1 | 11/2001 | Goldman et al. |
| 6,609,122 B1 | 8/2003 | Ensor |
| 6,799,189 B2 | 9/2004 | Huxoll |
| 6,816,898 B1 | 11/2004 | Garg et al. |
| 6,895,586 B1 | 5/2005 | Brasher et al. |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,392,300 B2 | 6/2008 | Anantharangachar |
| 7,619,512 B2 | 10/2009 | Gerber |
| 7,617,073 B2 | 11/2009 | Trinon |
| 7,685,167 B2 | 3/2010 | Mueller |

(Continued)

OTHER PUBLICATIONS

Gonazalez et al.: "Semantic representations for knowledge modelling of a Natural Language Interface to Databases using ontologies"; International Journal of combinatorial optimization Problems and Informatics; Aug. 1, 2015; pp. 28-42 (XP055682974).

(Continued)

*Primary Examiner* — Merilyn P Nguyen
(74) *Attorney, Agent, or Firm* — Fletcher Yoder PC

(57) ABSTRACT

In accordance with the present approach, concurrent processing is employed to facilitate a data import process. By way of example, in accordance with the present approach, local or external data to be imported is partitioned into multiple, separate import sets. In the subsequent stage, the import sets are processed concurrently to populate the target table.

20 Claims, 13 Drawing Sheets

(56) References Cited

U.S. PATENT DOCUMENTS

| | | |
|---|---|---|
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,983 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 4/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,396,242 B2 | 7/2016 | Varley et al. |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 10,754,565 B2 * | 8/2020 | Graefe ............... G06F 9/52 |
| 2007/0203952 A1 | 8/2007 | Baron et al. |
| 2007/0239791 A1 * | 10/2007 | Cattell ............. G06F 16/27 |
| 2012/0259894 A1 * | 10/2012 | Varley ............. G06F 16/93 |
| | | 707/795 |
| 2016/0179437 A1 | 6/2016 | Piduri et al. |
| 2018/0129693 A1 * | 5/2018 | Chatterjee ......... G06F 16/2343 |
| 2020/0034365 A1 * | 1/2020 | Martin ............. G06F 16/2358 |
| 2020/0042522 A1 * | 2/2020 | Zait ............... G06F 16/221 |

OTHER PUBLICATIONS

Pazos R. et al: "Comparative Study on the Customization of Natural Language interfaces to Databases"; Springerplus, vol. 5, No. 1, Apr. 30, 2016 (XP055683685).

Nihalani et al.: "Natural langauge Interface for Database: A Brief review", IJCSI International Journal of Computer Science Issues, vol. 8, Issue 2, Mar. 1, 2011, pp. 600-608 (XP05581542).

International Search Report and Written Opinion of PCT Application No. PCT/US2020/014286 dated Apr. 20, 2020; 16 pgs.

* cited by examiner

| | DATA SOURCES | NEW | GO TO | UPDATED ▽ | SEARCH | ▼ ▼ | 1 | TO 20 OF 20 ▲ ▲▼ |
|---|---|---|---|---|---|---|---|---|
| ▽ ALL | | | | | ≡ NAME | ≡ TYPE | ≡ FORMAT | ≡ UPDATED ▽ |
| ☐ | | | | ⊕ | CONCURRENT IMPORT TEST | FILE | EXCEL (.XLSX/.XLS) | 2018-08-06 13:56:10 |
| ☐ | | | | ⊕ | TEST CSV DATA COURCE | FILE | EXCEL (.XLSX/.XLS) | 2018-08-02 08:57:43 |
| ☐ | | | | ⊕ | DOMAIN DATA SOURCE | FILE | EXCEL (.XLSX/.XLS) | 2018-08-01 13:24:20 |
| ☐ | | | | ⊕ | EXAMPLE CSV FTP SSL TEST | FILE | CSV | 2018-08-01 10:55:57 |
| ☐ | | | | ⊕ | EXAMPLE CSV TEST USERS ON PATH | FILE | CSV | 2018-08-01 10:29:58 |
| ☐ | | | | ⊕ | EXAMPLE CSV TAB TEST USERS ON PATH | FILE | CSV (TAB) | 2018-08-01 10:59:58 |
| ☐ | | | | ⊕ | EXAMPLE JDBC MYSQL GLIDE.SYS USER | FILE | CSV (TAB) | 2018-08-01 10:59:58 |
| ☐ | | | | ⊕ | EXAMPLE JDBC ORACLE LOCATION | JDBC | MYSQL | 2018-08-01 10:59:58 |
| ☐ | | | | ⊕ | CONCURRENT IMPORT TEST | JDBC | ORACLE | 2018-08-01 10:59:58 |
| ☐ | | | | ⊕ | EXAMPLE XLS TEST USERS ON PATH | FILE | EXCEL (.XLSX/.XLS) | 2018-08-01 10:59:58 |
| ☐ | | | | ⊕ | GOOGLE EXAMPLE | OIDC | | 2018-02-06 13:44:33 |
| ☐ | | | | ⊕ | OKTA EXAMPLE | OIDC | | 2018-02-02 14:22:38 |

| ☰ SCHEDULED DATA IMPORTS [NEW] SEARCH [FOR TEXT ▽] [SEARCH] | | ▼▼▼ | ☐ 1 | TO 8 OF 8 ▲▲ |
|---|---|---|---|---|
| ▽ ALL | | | | |
| ⚙ ≡NAME | ≡RUN | ≡DATA SOURCE | ≡ACTIVE | ≡UPDATED ▽ |
| ☐ ⊖ EXAMPLE LDAP GROUP IMPORT | DAILY | EXAMPLE LDAP GROUP... | FALSE | 2018-05-22 13:50:07 |
| ☐ ⊖ EXAMPLE LDAP USER IMPORT | DAILY | EXAMPLE LDAP USERS | FALSE | 2018-05-22 13:58:36 |
| ☐ ⊖ DOMAIN DATA IMPORT | DAILY | DOMAIN DATA SOURCE | TRUE | 2018-08-01 14:35:34 |
| ☐ ⊖ CONCURRENT MUTEXT IMPORT | DAILY | CONCURRENT IMPORT... | TRUE | 2018-08-15 11:59:19 |
| ☐ ⊖ PARENT SCHEDULE IMPORT | DAILY | CONCURRENT IMPORT... | TRUE | 2018-08-15 10:29:36 |
| ☐ ⊖ SECOND CHILD IMPORT | AFTER... | CONCURRENT IMPORT... | TRUE | 2018-08-01 13:06:46 |
| ☐ ⊖ THIRD IMPORT TEST | AFTER... | CONCURRENT IMPORT... | TRUE | 2018-08-15 13:40:01 |
| ☐ ⊖ FIRST CHILD IMPORT SET | AFTER... | CONCURRENT IMPORT... | TRUE | 2018-08-15 13:37:43 |
| ☐ ACTIONS ON SELECTED ROWS... ◆ | | ▼▼▼ | ☐ 1 | TO 8 OF 8 ▲▲ |

FIG. 12

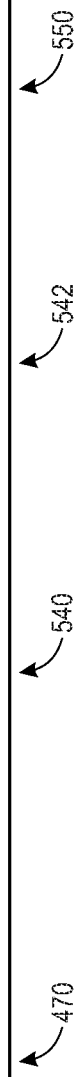

FIG. 15

| | | IMPORT SET | SCHEDULE IMPORT | STATE | CURRENT IMPORT SET |
|---|---|---|---|---|---|
| | | ISET0010127 | CONCURRENT MUTEXT IMPORT | COMPLETED | CISET0010009 |
| | | ISET0010126 | CONCURRENT MUTEXT IMPORT | COMPLETED | CISET0010009 |
| | | ISET0010125 | CONCURRENT MUTEXT IMPORT | COMPLETED | CISET0010008 |
| | | ISET0010124 | CONCURRENT MUTEXT IMPORT | COMPLETED | CISET0010008 |
| | | ISET0010123 | CONCURRENT MUTEXT IMPORT | COMPLETED | CISET0010007 |
| | | ISET0010122 | CONCURRENT MUTEXT IMPORT | COMPLETED | CISET0010007 |
| | | ISET0010121 | DOMAIN DATA IMPORT | COMPLETED | CISET0010006 |
| | | ISET0010120 | DOMAIN DATA IMPORT | COMPLETED | CISET0010006 |
| | | ISET0010119 | CONCURRENT MUTEXT IMPORT | COMPLETED | CISET0010005 |
| | | ISET0010118 | CONCURRENT MUTEXT IMPORT | COMPLETED | CISET0010005 |
| | | ISET0010117 | CONCURRENT MUTEXT IMPORT | COMPLETED | CISET0010004 |
| | | ISET0010116 | CONCURRENT MUTEXT IMPORT | COMPLETED | CISET0010004 |

| ▼ FILTER NAVIGATION | ≡ SCHEDULED DATA IMPORTS [NEW] SEARCH [FOR TEXT ▽] [SEARCH] | | | ▼▼ ▼ [ 1 ] TO 20 OF 103 ▲ ▲▲ | |
|---|---|---|---|---|---|
| ⊟ ☆ ⏱ | ▽ ALL > NAME >= IMPORT SET | | | | |
| SELF-SERVICE | ⚙ ≡ NAME △ | ≡ NEXT ACTION | ≡ TRIGGER TYPE | ≡ JOB ID | ≡ SATE |
| HOMEPAGE | ♀ [ SEARCH ] | [ SEARCH ] | [ SEARCH ] | [ SEARCH ] | [ SEARCH ] |
| BUSINESS APPLICATIONS | ☐ ⊖ IMPORT SET DELETER | 2018-08-16 00:00:00 | DAILY | | READY |
| DASHBOARDS | ☐ ⊖ IMPORT SET TRANSF... | 2018-07-27 10:55:54 | INTERVAL | IMPORT SET TRAN... | READY |
| SERVICE CATALOG | ☐ ⊖ IMPORT SET TRANSF... | 2018-08-15 14:13:12 | INTERVAL | IMPORT SET TRAN... | READY |
| KNOWLEDGE | ☐ ⊖ IMPORT SET TRANSF... | 2018-08-15 14:12:54 | INTERVAL | IMPORT SET TRAN... | READY |
| HELP THE HELP DESK | ☐ ⊖ IMPORT SET TRANSF... | 2018-07-27 10:58:12 | INTERVAL | IMPORT SET TRAN... | READY |
| VISUAL TASK BOARDS | ☐ ⊖ INDEX PERFORMANC... | 2018-07-15 15:00:00 | RUN AT SYSTE... | INDEXPERFORMAN... | READY |
| CONNECT CHAT | ☐ ⊖ INIT SERVICE DESIGN... | 2014-09-10 00:00:00 | RUN AT SYSTE... | RUNSCRIPJOB | READY |
| INCIDENTS | ☐ ⊖ INIT SERVICE PORTAL... | 2014-09-10 00:00:00 | RUN AT SYSTE... | RUNSCRIPJOB | READY |
| WATCHED INCIDENTS | ☐ ⊖ INIT UI METADATA | 1969-12-31 16:00:00 | REPEAT | RUNSCRIPJOB | READY |
| MY REQUEST | ☐ ⊖ LDAP CONNECTION T... | 2018-08-15 14:19:51 | | RUNSCRIPJOB | READY |
| REQUESTED ITEMS | ☐ ⊖ LDAP NOTIFY | (EMPTY) | RUN AT SYSTE... | RUNSCRIPJOB | READY |
| ⊘ | ↖ 580 | ↖ 582 | ↖ 584 | ↖ 586 | ↖ 590 |

*FIG. 16*

CONCURRENT DATA IMPORTS

BACKGROUND

The present technique relates generally to importing data in accordance with a schedule.

This section is intended to introduce the reader to various aspects of art that may be related to various aspects of the present technique, which are described and/or claimed below. This discussion is believed to be helpful in providing the reader with background information to facilitate a better understanding of the various aspects of the present technique. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

As part of using cloud computing resources, a client may use a cloud based resource as well as local or external systems. In such a situation, it may be desirable to bring data stored or generated locally or on an external system into a database maintained on the cloud computing resource. Such data importing may be part of a routine process, where the external or local data generation is part of an ongoing client process, or a one-time or limited-time event, such as part of a data integration or onboarding event. As may be appreciated, however, for large data sets or files (e.g., millions of records), such an operation may be time-consuming and resource intensive.

SUMMARY

A summary of certain embodiments disclosed herein is set forth below. It should be understood that these aspects are presented merely to provide the reader with a brief summary of these certain embodiments and that these aspects are not intended to limit the scope of this discussion. Indeed, this technique may encompass a variety of aspects that may not be set forth below.

As discussed herein, the present approach addresses various issues related to importing locally or externally generated data to a cloud-based resource, such as may be available as part of a client instance of a cloud platform. Such an import process may occur in separate stages, with a first stage corresponding to importing client data from an external source to a cloud-based resource, (e.g., to a staging (i.e., temporary) table within a client instance maintained on the cloud) and a second stage corresponding to transforming the data from the staging table to target table utilized on the instance by the client). At the first stage, an import file (or other data set) external to the client instance is parsed, and the data extracted and stored in the staging table on the client instance. In one example of an implementation, column headers in the data file to be imported (e.g., a csv or spreadsheet file) or table column names (e.g., in a JDBC import file) are used as the column names in staging table. With respect to the transformation step in this example, these names are mapped to corresponding target table columns, such as based upon a user defined mapping scheme. That is, in this example, if there is a column in the external data file referenced as "Name" there will be a corresponding column referenced as "Name" in the staging table. Based on the transform mapping, this "Name" column in the staging table may be associated with a "User Name" column in the target table. In some circumstances, additional processing may be performed as part of the transformation step after basic mapping or user-established rules may be invoked upon inserting or updating data in the target table. In conventional approaches, such an import process may be time and resource intensive.

In accordance with the present approach, concurrent processing is employed to facilitate the import process. By way of example, in accordance with the present approach data to be imported is partitioned into multiple, separate import sets. The multiple imports set mechanism allows import rows to be grouped within the staging table. Thus, while conventional approaches group all import rows to one import set, which is subsequently processed in a sequential or single-threaded fashion, the approach discussed herein groups the imports rows into multiple import sets within the staging table, allowing the import set rows to be transformed concurrently using one thread per import set.

Various refinements of the features noted above may exist in relation to various aspects of the present technique. Further features may also be incorporated in these various aspects as well. These refinements and additional features may exist individually or in any combination. For instance, various features discussed below in relation to one or more of the illustrated embodiments may be incorporated into any of the above-described aspects of the present technique alone or in any combination. The brief summary presented above is intended only to familiarize the reader with certain aspects and contexts of embodiments of the present technique without limitation to the claimed subject matter.

BRIEF DESCRIPTION OF THE DRAWINGS

Various aspects of this technique may be better understood upon reading the following detailed description and upon reference to the drawings in which:

FIG. 10 depicts an example of a screen from which a user may select data to be imported to a cloud resource, in accordance with aspects of the present approach;

FIG. 11 depicts an example of a screen displayed in response to a data set being selected for import to a cloud resource, in accordance with aspects of the present approach;

FIG. 12 depicts an example of a screen from which a user may view a list of scheduled jobs, in accordance with aspects of the present approach;

FIG. 15 depicts an example of a screen from which a user may view a listing of import data sets, in accordance with aspects of the present approach;

FIG. 16 depicts an example of a screen from which a user may view or select a system trigger associated with a data import and transform operation, in accordance with aspects of the present approach.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As discussed herein, the present approach facilitates concurrent processing of data to be imported, such as from an external source, to a table or database within a client instance made accessible in a cloud computing environment. In accordance with this approach, data to be imported undergoes a two stage import process. In the first stage, client data from an external source is imported to a cloud-based resource, (e.g., to a staging (i.e., temporary) table within a client instance maintained on the cloud). At this first stage, the data to be imported (e.g., an import file) is partitioned into multiple, separate import sets data which allows import rows to be grouped by import set within the staging table. In this manner, the import rows corresponding to different imports sets within the staging table may be concurrently processed in the subsequent transformation step, such as by a different thread for each import set. In this manner different import sets of the data may be concurrently processed to update the target table based upon client defined column mappings and/or other rules.

Figure 1:
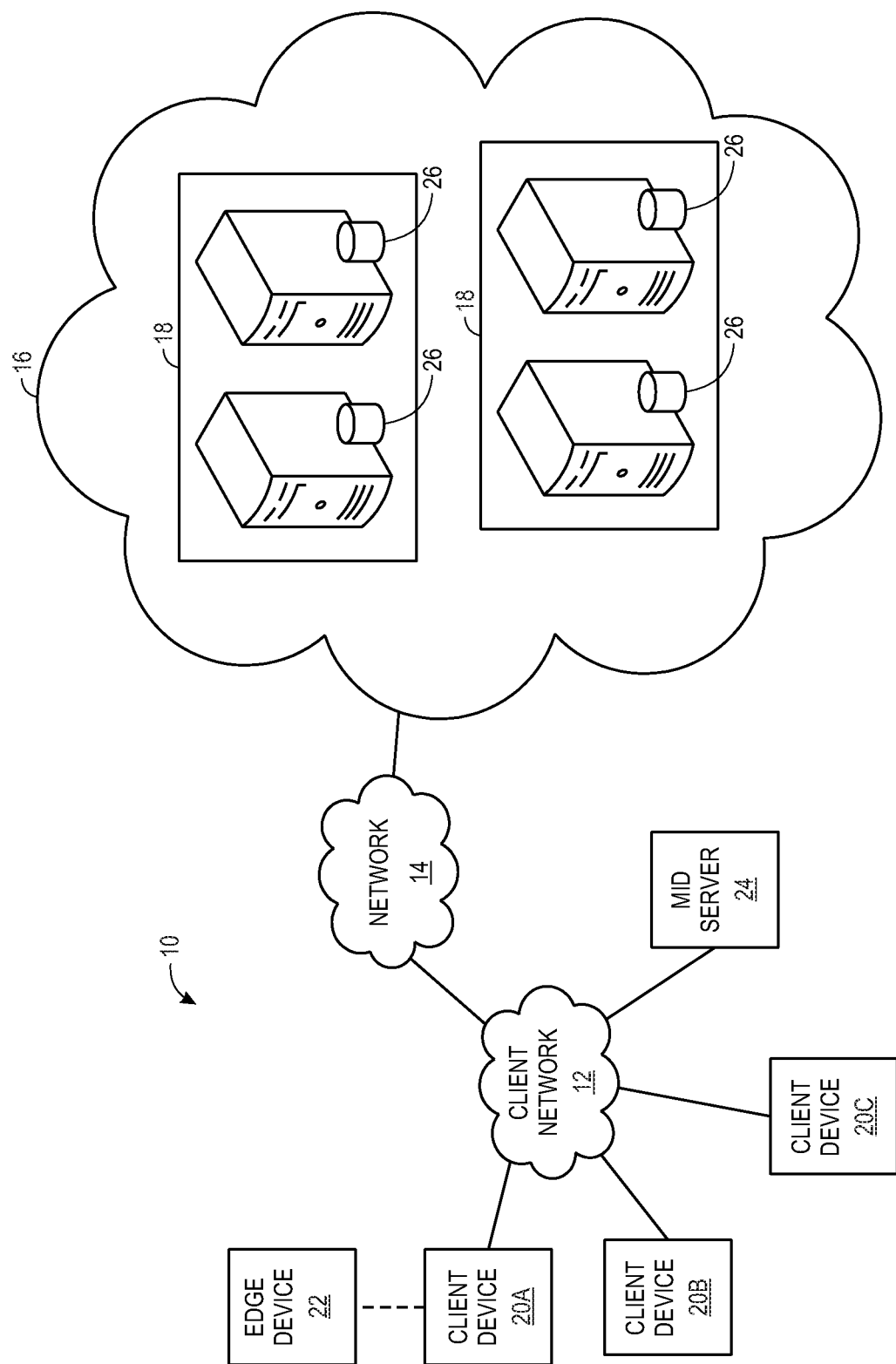
FIG. 1 is a block diagram of an embodiment of a cloud architecture in which embodiments of the present approach may operate.

With the preceding in mind, the following figures relate to various types of generalized system architectures or configurations that may be employed to provide services to an organization (e.g., a client) using a cloud-based architecture, such as a multi-instance or multi-tenant framework, and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present approach may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
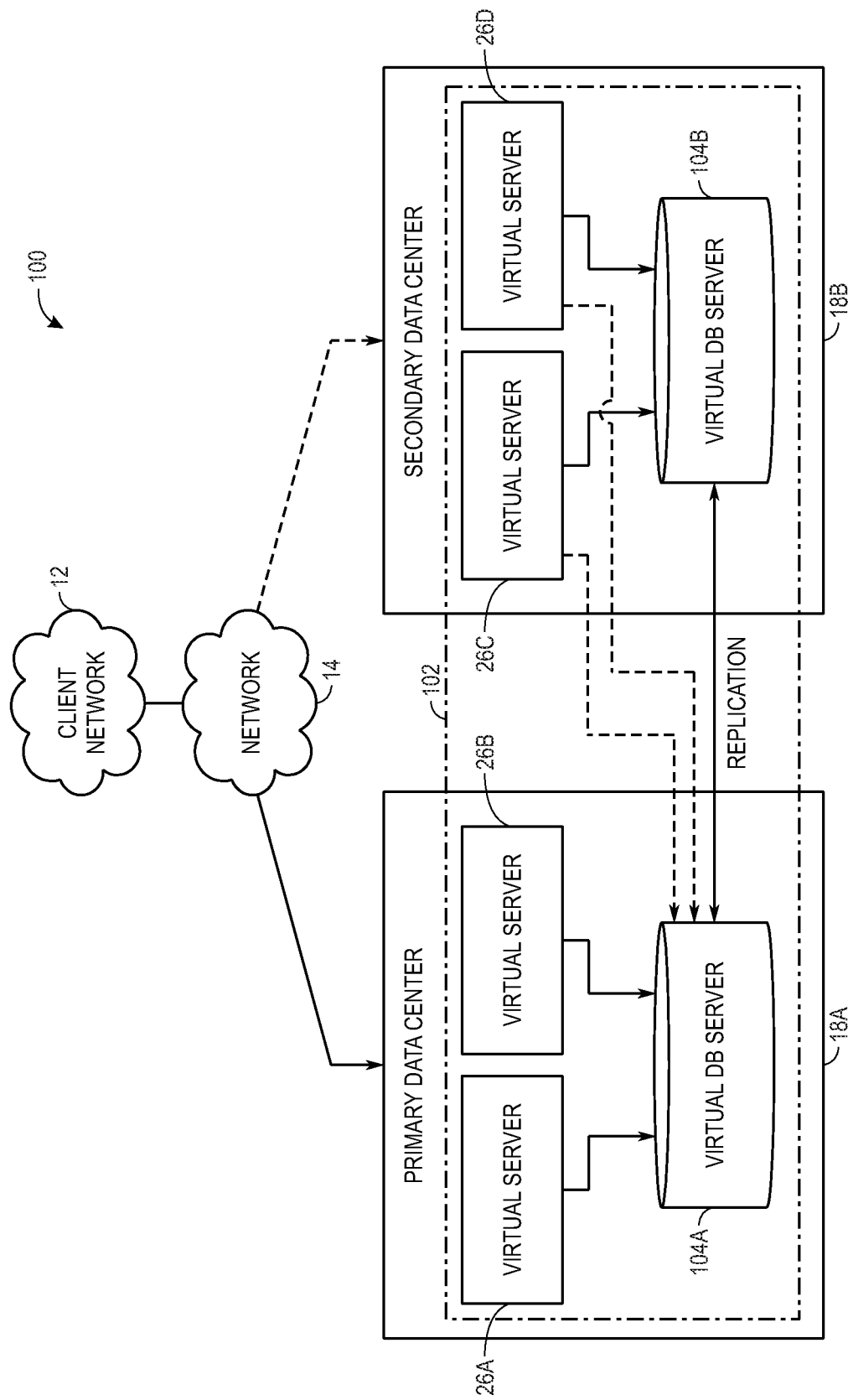
FIG. 2 is a schematic diagram of an embodiment of a multi-instance cloud architecture in which embodiments of the present approach may operate.

FIG. 2 is a schematic diagram of an embodiment of a multi-instance cloud architecture 100 where embodiments of the present approach may operate. FIG. 2 illustrates that the multi-instance cloud architecture 40 includes the client network 12 and the network 18 that connect to two (e.g., paired) data centers 18A and 18B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 42. In the depicted example, to facilitate availability of the client instance 42, the virtual servers 26A-26D and virtual database servers 104A and 104B are allocated to two different data centers 18A and 18B so that one of the data centers 22 acts as a backup data center. Other embodiments of the multi-instance cloud architecture 40 could include other types of dedicated virtual servers, such as a web server. For example, the client instance 42 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the technique is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present technique may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The depicted implementations and discussion of FIGS. 1 and 2 are only examples to facilitate ease of description and explanation and are not intended to limit the technique to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
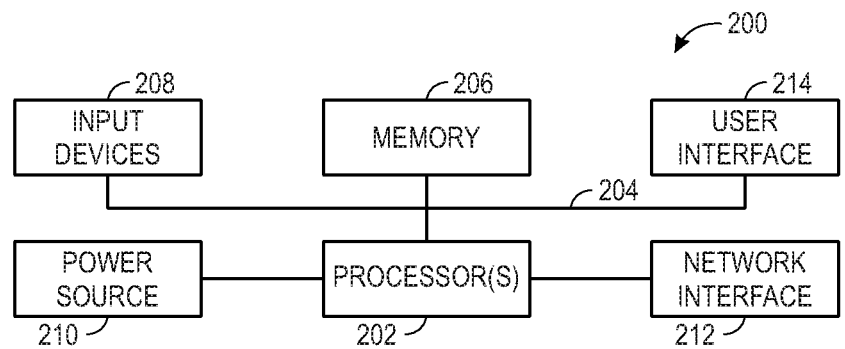
FIG. 3 is a block diagram of a computing device utilized in a computing system that may be present in FIG. 1 or 2, in accordance with aspects of the present approach.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
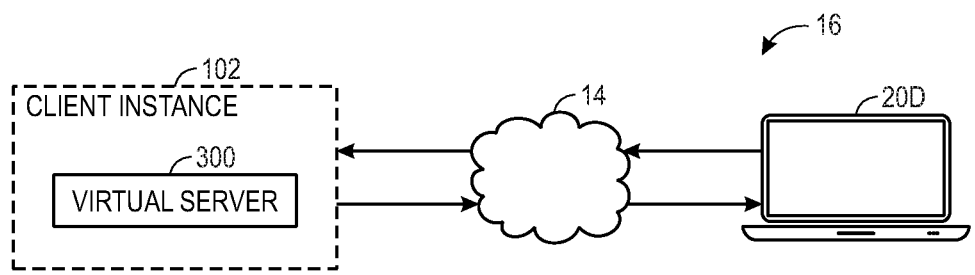
FIG. 4 is a block diagram illustrating an embodiment in which a virtual server supports and enables the client instance, in accordance with aspects of the present approach.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102 which may itself support one or more application nodes running applications and accessing data for use by the client device. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
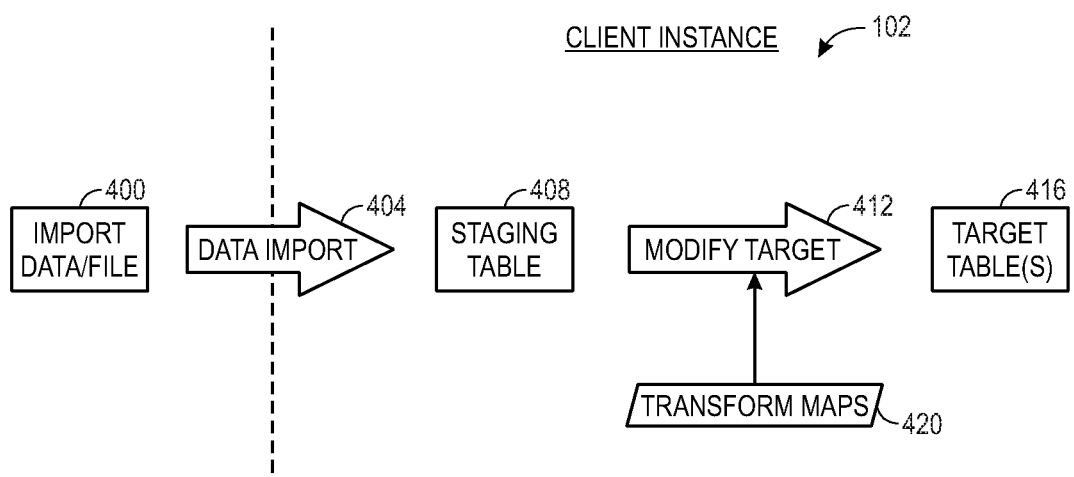
FIG. 5 depicts a non-concurrent data file import to a cloud-supported table.
Figure 6:
FIG. 6 depicts an example of a single import set generated in response to a single import job.

Turning now to FIGS. 5 and 6, as noted above the present approach addresses issues related to importing locally or externally generated data to a cloud-based resource, such as a table or database maintained as part of a client instance 102 of a cloud-based platform 16. Such a data import process may occur in a multi-stage, process, a conventional example of which is illustrated in FIG. 5. In this example, the local or externally generated data is represented as import data 400 (e.g., a data file or document). This import data 400 may represent data generated by applications running locally in the client environment, such as on an application provided by a third party or other external entity that is not part of the client instance 102 or by other local processes or applications of the client. Further, as discussed herein, the import data 400 may represent ongoing activity, in which the import processes discussed herein may be performed regularly (such as to allow externally generated data to be available to separate applications running within the client instance 102), or a one-time or limited-time event, such as a data integration or onboarding event.

In this example, an initial stage may be, upon selection or identification of the import data 400, to import (step 404) the import data 400 (e.g., a flat file, spreadsheet, or database table) a staging table 408 (e.g., a temporary table) located in the client instance 102. As may be appreciated, the import job associated with importing the import data 400 may be run on a scheduled or periodic basis or may be run on-demand, such as by being initiated manually by a user.

In this example, the staging table 408 stores parsed data based on column or field name as present in the original data file 400. This step effectively moves the import data 400 from the client local environment to the client instance 102 based on the cloud platform 16. As may be appreciated, in the depicted example, the import data 400 is imported as a single import set as a consequence of being generated via a single import operation or job. An example of such an import set stored in a staging table 408 is depicted in FIG. 6 in tabular form, where the import set identifier, here denoted SET, has a value of ISE001 for each record, which indicates in this example that each record is part of a first or only import set. The ROW value corresponds to or indexes each record being imported. Such an approach avoids issues related to data duplication or inadvertent data omission, but may be slow and resource constrained, particularly for large data files.

Once in the client instance 102, the data in the staging table 408 may be processed to modify (step 412) a target table or tables 416. The modify step 412 may take the form of an update or insert operation or query used to update target table(s) 416 based on data found in the staging table 408. At this stage, one or more transform maps 420 may be applied to map the import data 400 as represented into the staging table 408 to the appropriate format and/or layout of the target table(s) 416, which may include relationships or multi-table layout and/or may be configured for use by applications running on the client instance 102 and used by the client. In practice, the transformation step involved in modifying the target table(s) 416 may be implemented as a single threaded implementation of one or more transformation scripts and/or target table rules, and may therefore take substantial time (e.g., hours or days) to perform for large data sets.

Figure 7:
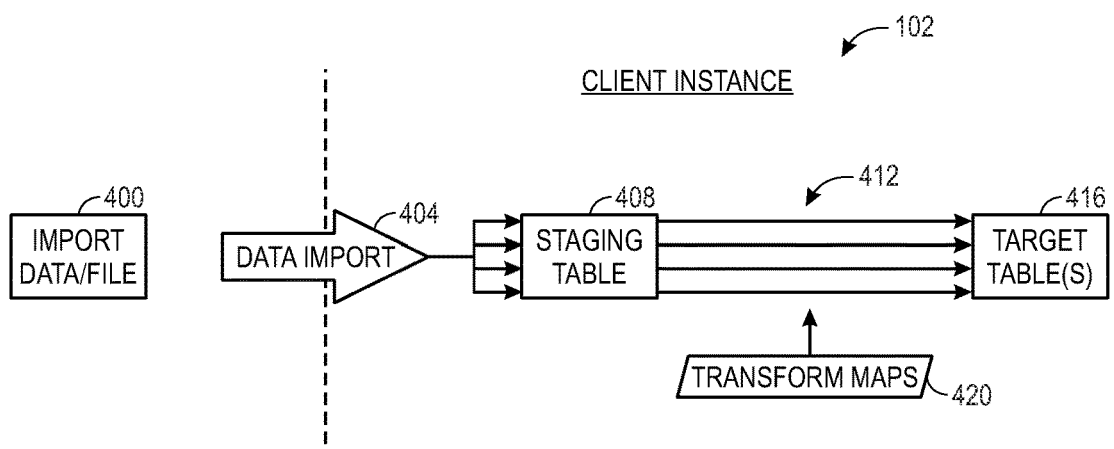
FIG. 7 depicts a concurrent data file import process to a cloud-supported table, in accordance with aspects of the present approach.

With the preceding in mind, in accordance with aspects of the present approach, concurrent processing is employed to facilitate the data import process from a local file to a table maintained on a client instance. Turning to FIG. 7, in accordance with the present approach data 400 to be imported is partitioned as part of the data import into multiple, separate import sets. In the subsequent stage, the different import sets stored in the staging table 408 are processed concurrently, such as using a multi-threaded process, at step 412 to update or populate the target table 416. As noted above, the modify step 412 may be based on update or insert commands or queries suitable for taking data in the staging table 408 and inserting or updating corresponding records in the target table(s) 416.

With respect to the data partitioning stage, in accordance with this approach, the import data 400 (e.g., a data file or table) is partitioned into N import sets, where N corresponds to the degree of concurrency supported or desired. In practice, the number of import sets may be based on the number of available transform jobs that can be worked at a given time. In one implementation, there may be two transform jobs made available per node (e.g., application node) running in the customer instance 102, so that a single application node gives rise to two transform jobs (and therefore two import sets), two application nodes gives rise to four transform jobs, and so forth. The number of available transform jobs, however, may vary from this ratio and/or may be customizable based on client need. Further, the relationship between nodes and transform jobs does not have to scale linearly, but may instead increase non-linearly to reflect that larger clients (As reflected by the number of nodes in the client instance 102) may have disproportionately greater data import needs.

Figure 8:
FIG. 8 depicts an example of a multiple import sets generated in response to an import job, in accordance with aspects of the present approach.

As in the preceding example, an example of a staging table 408 is depicted in FIG. 8 in tabular form to illustrate this multiple import set implementation. In this example, the data to be imported is partitioned into three separate import sets, denoted as ISE001, ISE002, and ISE003 in the respective import set identifier field, SET. In this manner, data is allocated (such as via a round robin or other suitable approach) so as to be divided among the N import sets for further processing. With respect to the processing of the partitioned import sets, once the data to be imported is partitioned into multiple import sets, these import sets may be processed concurrently using available worker threads.

Figure 9:
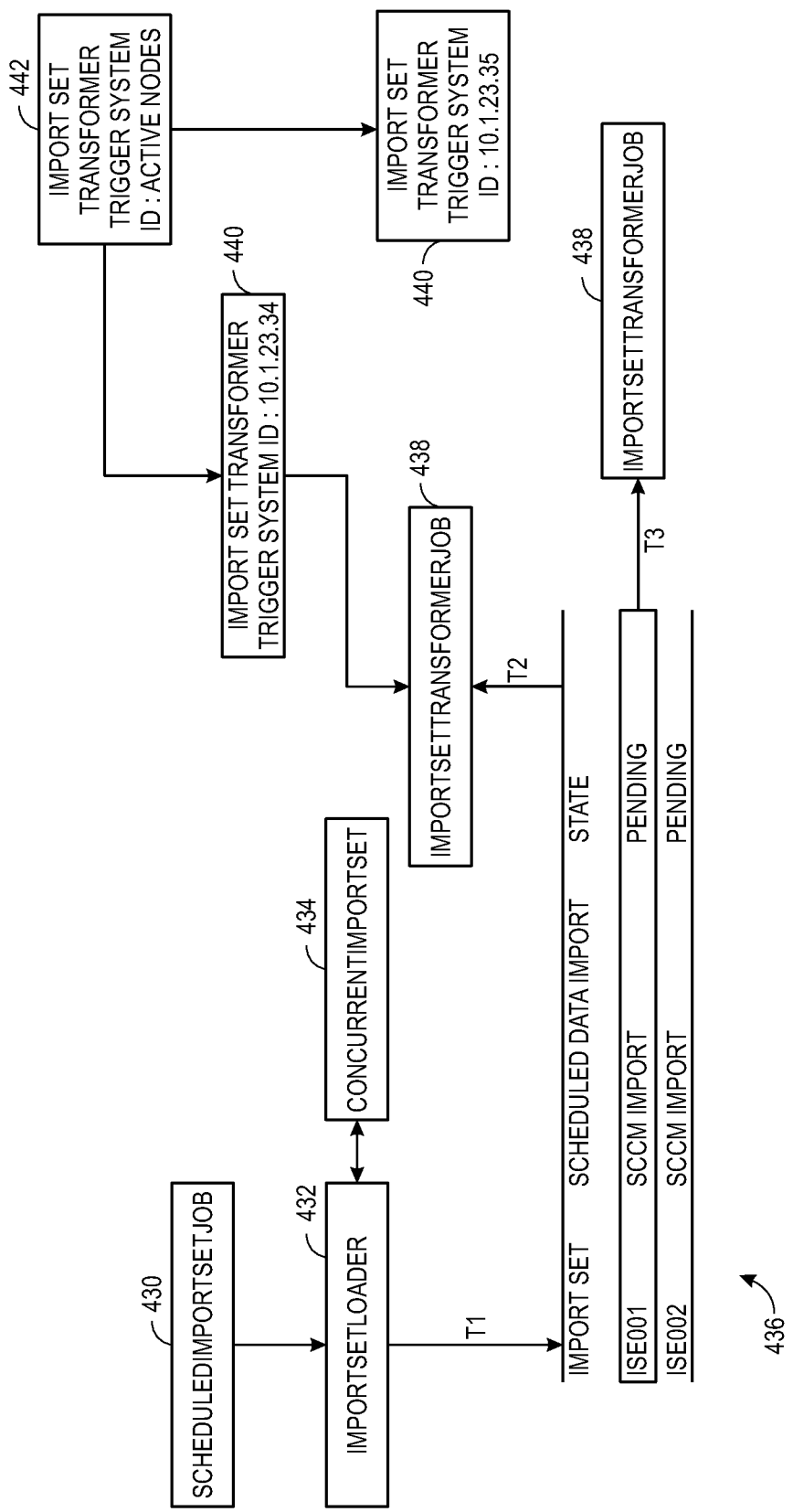
FIG. 9 depicts an overview of a concurrent data import process, in accordance with aspects of the present approach.

The above described aspects are illustrated in an alternative manner in FIG. 9. In this view, a scheduled import set job 430 may be initiated that invokes an import set loader task 432. Based on whether a concurrent import set flag 434 is set (as discussed in greater detail below) the import data 400 may be partitioned into multiple import sets (here ISE001 and ISE002).

After loading data into the multiple import sets, the import set identifiers may be inserted or added to a queue 436. A set of transform jobs 438 may poll this queue. When a job is found in the queue 436, it is pulled in the queue and processes, so if multiple (e.g, two, four, and so forth) jobs are found in the queue, all will be processed concurrently, as shown. As shown, the transform jobs 438 may each correspond to a respective transform trigger 440, with the number of triggers determined by the number of active nodes 442, as discussed in greater detail below.

With this in mind, in one implementation, the number of import sets is determined based on the number of available system triggers 440 (i.e., sys_triggers) to concurrently execute the transform jobs 438 needed to transform the data stored in the staging table 408 to how the data will be stored in the target table(s) 416. In one implementation, by default two system triggers 440 are defined for each active node 442 (e.g., application node) so that in a one node instance, two runnable system triggers will be defined, in a four node instance, eight system triggers will be defined, and so forth.

As noted above, concurrent processing of import data may introduce various issues not raised by non-concurrent import processes. For example, potential duplication of records in the target table 416 may arise in exceptional circumstances. In particular, coalesce fields may be used to define the unique key columns. After importing a data set there should not be two records with same coalesce field values. However, with the concurrent import sets, if two threads check for existence of a record simultaneously, both threads may end up with add the record, leading to the duplication of a data record.

With this in mind, in accordance with the present approach, such duplication of records in the target table 416 may be avoided by acquiring a row lock for each insertion of rows. The row lock may be based on a mutex object with coalesce values and target table names, where the mutex object, as used herein, is a synchronization object whose state indicates whether it is or is not currently ties to a thread (i.e., it can only be associated with one thread as a time). By employing mutex objects ties to the coalesce values and target table names, a process flow can be implemented in which insertion of duplicate records into the target table 416 is avoided in a multi-threaded process.

In other exceptional circumstances, it may be desirable to perform a data import process with concurrency, as discussed herein, but also to process one or more groups of the records to in the order in which they appear in the original import data 400, i.e., the order or sequence of records within a subset of the records may have significance. In practice, it may not be feasible to guarantee the order of processing of all records in the import data 400 while providing for concurrent processing. However, the order of processing for a subset of the records of the import data 400 can be assured if they are present in the same import set, as discussed above.

By way of example, in one embodiment, hashing may be employed to provide such custom partitioning. In one such example, the customer provides a script (with the current record as an input parameter) to define grouping (i.e., rows belonging to same group should return same value). By default, the row number may be used as the hash function (i.e., no grouping) and customers can customize it to allow for grouping. An example of one such grouping hash function is as follows:

```
answer = (function partitionHash(import_set_row) {
    return import_set_raw.u_category;
})(import_set_row);
```

With the preceding discussion and examples in mind, FIGS. 10-17 depict examples of screens illustrating aspects of the data import processes discussed above. For example, turning to FIG. 10, an interface (e.g., screen) is depicted from which a user may select import data (e.g., a data file or table) from among a list of local or external data sources for import to a cloud platform resource accessible via a client instance. In this example, import data 400 in the form of data files or tables of various formats are listed by name, type (e.g., file, JDBC, LDAP, OIDC, and so forth), and format (columns 450, 452, 454 respectively) along with an update timestamp (column 456). From an interface such as the one depicted, a user may select a data set accessible on a local or external, third-party system for importing to a resource maintained on cloud-based platform as part of a client instance 102.

Figure 11:
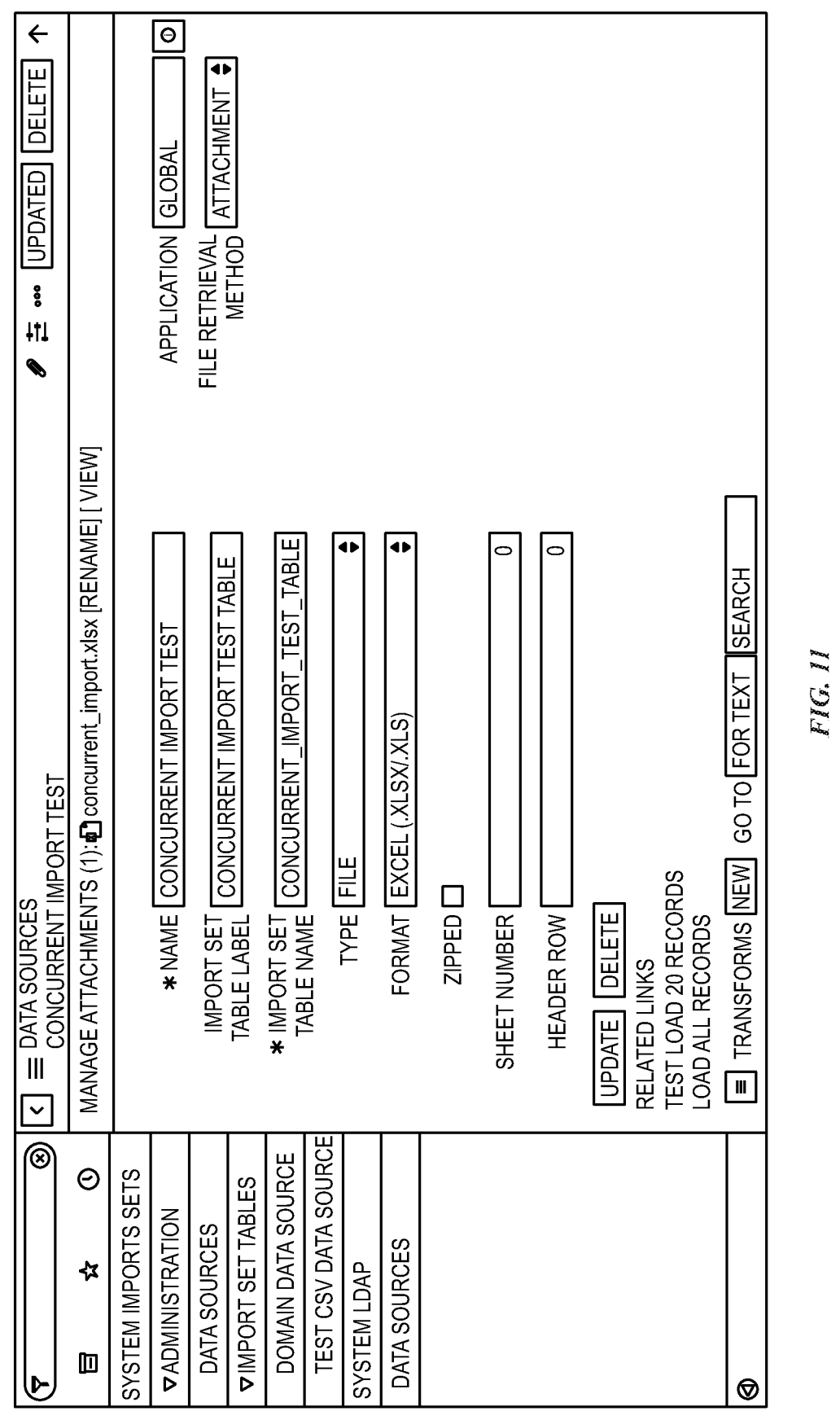

Turning to FIG. 11, an example of a screen is depicted that may be invoked or displayed upon selection of a data set listed on an interface such as the one shown in FIG. 10. In this example, additional details may be provided that are specific to the data set selected for import, such as any table labels and/or names to be applied as part of the import process, details as to the format (such as header rows) and/or compression of the import data 400, whether the data set is accessible to applications running in the client instance globally or not, and how the import data 400 will be provided to the import process (e.g., as an attachment or via other techniques).

A user-viewable list of scheduled import jobs is depicted in an example interface shown in FIG. 12. In this example, the different import jobs are referenced by name (column 470) for a user to review and select from. In addition, for each import job, other information may be displayed for a reviewer. For example, in this sample interface each scheduled and named import job has an associated run interval (e.g., daily, hourly, weekly, monthly, dependent on a prior event, etc.) (column 472), a designated or assigned data source (corresponding to import data 450 of FIGS. 10 and 11), an active or inactive status of the import job (column 474), and a timestamp 476 corresponding to the data and time last updated.

Figure 13:
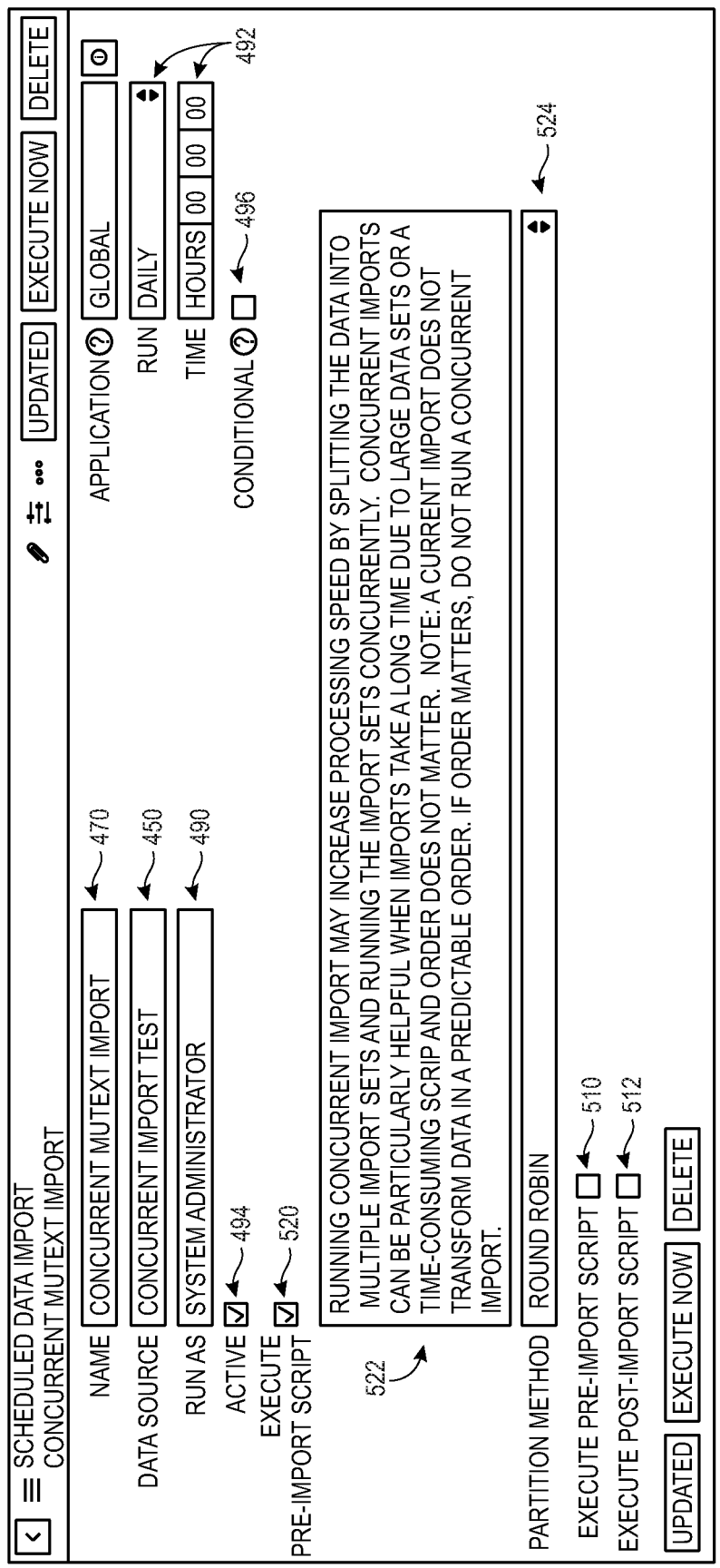
FIG. 13 depicts an example of a screen from which a user may configure a job, in accordance with aspects of the present approach.
Figure 14:
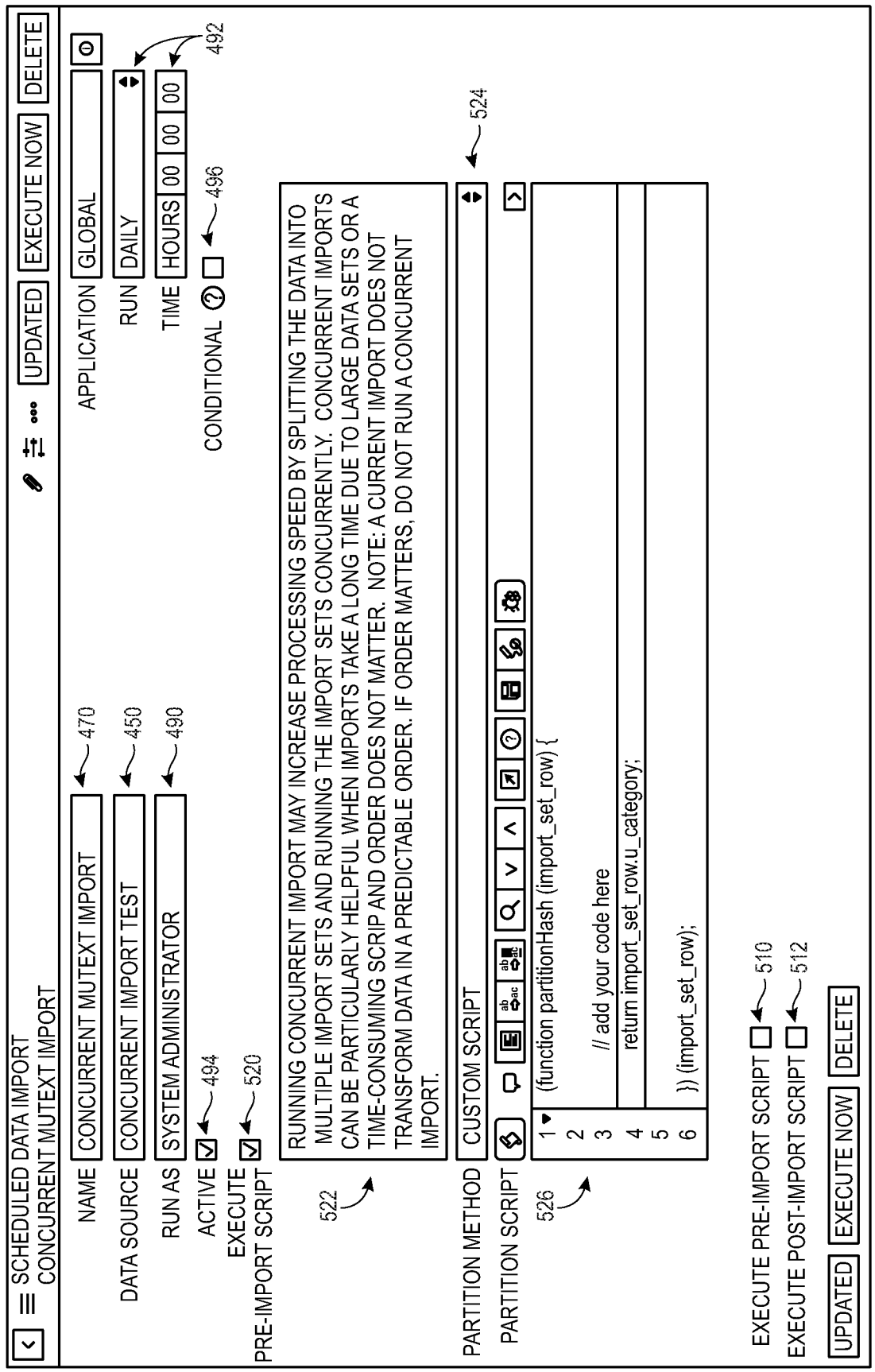
FIG. 14 depicts a further example of a screen from which a user may configure a job, in accordance with aspects of the present approach.

The configuration of an import job selected from the example interface of FIG. 12 is shown in FIGS. 13 and 14. In this example, the details include the name 470 of the import job shown with the data source (i.e., selected import data 450) as well as details related to permissions (field 490), scheduling (fields 492), status (e.g., active or inactive) (field 494), dependencies (field 496), and so forth. In addition, the depicted example of an interface allows for the support of scripted command before (field 510) and/or after (field 512) execution of the import job. In addition, and relevant to the preceding examples and discussion, a configurable option to perform the respective import job with concurrent processing (field 520) or not is also provided. In this example, a tool tip 522 is also displayed providing information to the user as to the benefits and limitations of selecting to process the job with concurrency. Based on the state of the concurrent processing control, the import job may generate either a single import set or multiple, concurrently generated and processed import sets.

In the example illustrated in FIGS. 13 and 14, an option 524 is provided for a user to specify a partition method for partitioning of the import data file when concurrent import is selected. In the example shown in FIG. 13, the partition method illustrated is a "round robin" approach that distributes records between import sets in accordance with a round robin scheme. Such a round robing distribution may be the default option in one embodiment. Conversely, and as shown in the example provided in FIG. 14, a user may instead opt to partition the import data file based on a custom script, with a script entry box 526 being provided for a script to be entered if this option is selected.

Turning to FIG. 15, an interface screen showing concurrent import jobs is shown in which the corresponding import sets and concurrent import sets are listed. As may be appreciated such a display may be provided to a user for those import jobs for which concurrent processing has been selected.

Each listed import set (column 470) is unique and presumably corresponds to a separate staging table 408. Details may also be displayed related to the schedule and import job type (column 540) and status of the import job (column 542). In the event an import job is performed with concurrency, multiple separate and distinct import sets 470 are generated with respect to a single set of import data 450, though the separate import sets in combination or in the aggregate convey the data of the import data set. Thus, in combination, a set of import sets 470 may correspond to a single concurrent import set 550 that corresponds to the data associated with a set of import data, even though the import data is processed through separate import sets to achieve concurrent processing. Thus, and as shown in FIG. 15, a concurrent import set 550 (e.g., CISET0010009) may be associated with multiple import sets 470 (e.g., ISET0010127 and ISET0010126) as a consequence of concurrent import processing.

Figure 17:
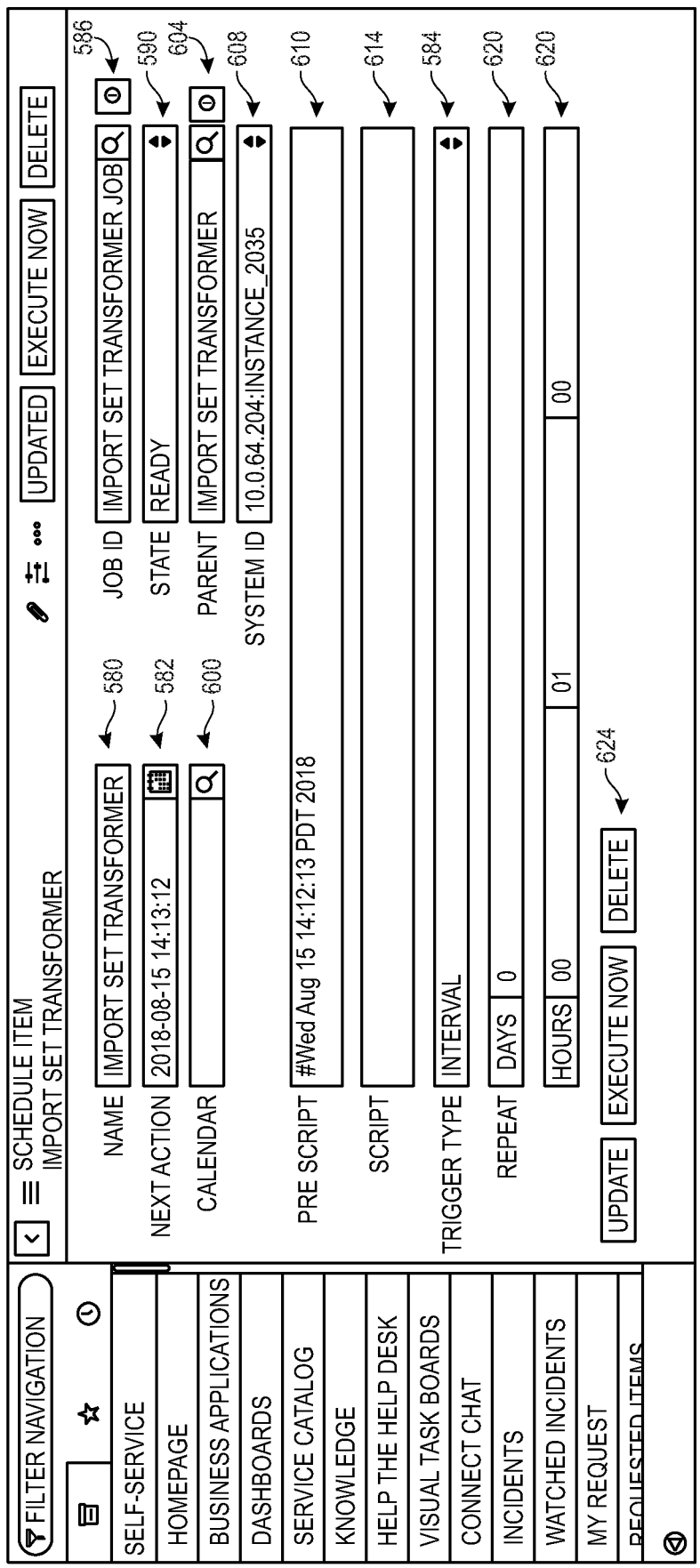
FIG. 17 depicts an example of a screen from which a user may configure or view details associated with a system trigger, in accordance with aspects of the present approach.

With respect to the insertion of the import set data stored in the staging table 408 to the target table(s) 416, as noted above this may occur in response to one or more configurable system triggers. FIGS. 16 and 17 provide some additional detail as to how such triggers may be presented to a user and/or configured by a user. By way of example, FIG. 16 depicts an example of an interface in which different system triggers (column 580) are listed that may be associated with certain respective import set data to a specified target table 416. In this example, respective triggers 580 may each be associated with a respective date and time (column 582) at which the trigger will next be run, a trigger type (column 584) (e.g., daily, interval, run at startup, run on shutdown, repeat, and so forth), a job identifier (column 586), and a current state (column 590) (e.g., ready, disabled, and so forth).

Turning to FIG. 17, an example of an interface shown in response to a trigger being selected (e.g., a trigger detail screen) is shown. As shown in this detail view, fields are provided corresponding to the next action 582, job identifier 586, state, 590, and trigger type 584 fields shown in the list view of FIG. 16. In addition, fields may be provided for viewing or configuring a calendar date or date time (field 600), a parent or template trigger (field 604), a system identifier (field 608), a job context or description (field 610), and/or an executable script (field 614). Fields 620 may also be provided to allow a user to view or configure a time interval for triggers that repeat. User selectable features 624 (e.g., buttons) may also be provided to allow a user to update, run, or delete a trigger. In one implementation, there are two parent scheduled tasks by default and parent tasks deploy child tasks at run time to an active node so that processing is distributed among active nodes.

With the preceding in mind, the present approach facilitates concurrent processing of data to be imported, such as from an external source, to a table or database within a client instance made accessible in a cloud computing environment. As discussed herein, data to be imported is partitioned into multiple, separate import sets which populate a staging table. The data in the staging table is processed concurrently to populate a target table or tables. The processing of the staging table to populate the target table or tables may be in response to one or more system triggers.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a memory storing instructions; and
one or more processors configured to execute the instructions, wherein a client instance is hosted by one or more data centers comprising the memory and the one or more processors, wherein the client instance is accessible by one or more remote client networks, wherein the one or more processors are configured to perform operations comprising:
receiving a selection of data stored external to the client instance;
partitioning the data into two or more import data sets;
importing the two or more import data sets to a staging table in the client instance, wherein each import data set comprises a different subset of the data;
modifying one or more target tables by concurrently processing the two or more import data sets from the staging table to update or insert records in the one or more target tables; and
applying a row lock in a respective target table of the one or more target tables based on an insertion operation to avoid duplication of the data during concurrent processing.

2. The system of claim 1, wherein the data stored external to the client instance comprises data generated and stored locally by at least one client device on the one or more remote client networks.

3. The system of claim 1, wherein the data stored external to the client instance comprises data generated by one or more applications external to the client instance.

4. The system of claim 1, wherein importing the two or more import data sets is performed on a scheduled or periodic basis.

5. The system of claim 1, wherein concurrently processing the two or more import data sets comprises mapping the import data sets from a staging table layout or format to a target table layout or format.

6. The system of claim 5, wherein the mapping is based on one or more transform maps.

7. The system of claim 1, wherein a multi-threaded process is used to concurrently process the two or more import data sets.

8. The system of claim 1, wherein a number of threads available for concurrently processing the two or more import data sets is based on a number of application nodes running in the client instance.

9. The system of claim 8, wherein two threads exist for each application node.

10. A method of importing an external data set to a cloud instance, comprising:
partitioning a data set stored external to a client instance into two or more import data sets, wherein the client instance is hosted by one or more data centers and is accessible by one or more remote client networks;
importing the two or more import data sets to a staging table in the client instance, wherein each import data set comprises a different subset of the data set;
concurrently processing the two or more import data sets stored in the staging table to update or insert records into one or more target tables; and
applying a row lock in a respective target table of the one or more target tables based on an insertion operation to avoid duplication of data during concurrent processing.

11. The method of claim 10, wherein concurrently processing the two or more import data sets comprises mapping the import data sets from a staging table layout or format to a target table layout or format.

12. The method of claim 11, wherein the mapping is based on one or more transform maps.

13. The method of claim 10, wherein a number of threads available for concurrently processing the two or more import data sets is based on a number of application nodes running in the client instance.

14. The method of claim 13, wherein two threads exist for each application node.

15. A non-transitory machine-readable storage medium storing executable instructions that, when executed by a processor, cause operations to be performed comprising:

receiving a selection of data stored external to a client instance;

partitioning the data into two or more import data sets;

importing the two or more import data sets to a staging table in the client instance, wherein each import data set comprises a different subset of the data;

modifying one or more target tables by concurrently processing the two or more imports data sets from the staging table to insert or update records in the one or more target tables; and applying a row lock in a respective target table of the one or more target tables based on an insertion operation to avoid duplication of the data during concurrent processing.

16. The non-transitory machine-readable storage medium of claim 15, wherein concurrently processing the two or more import data sets comprises mapping the import data sets from a staging table layout or format to a target table layout or format.

17. The non-transitory machine-readable storage medium of claim 15, wherein a multi-threaded process is used to concurrently process the import data sets.

18. The non-transitory machine-readable storage medium of claim 15, wherein a number of threads available for concurrently processing the two or more import data sets is based on a number of application nodes running in the client instance.

19. The non-transitory machine-readable storage medium of claim 15, wherein importing the two or more import data sets is performed on a scheduled or periodic basis.

20. The non-transitory machine-readable storage medium of claim 18, wherein two threads exist for each application node.

* * * * *